(No Model.) 2 Sheets—Sheet 1.
T. S. DISSTON.
SAW GUMMING MACHINE.
No. 429,019. Patented May 27, 1890.
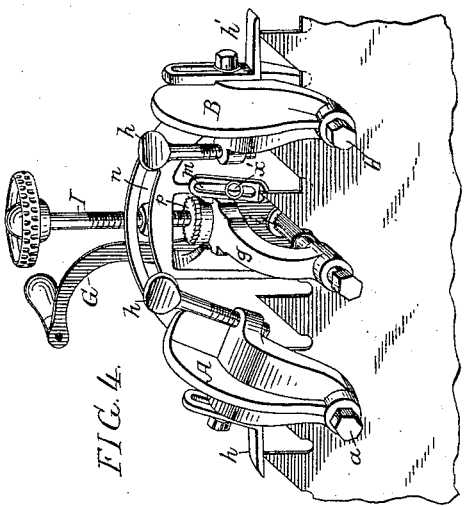
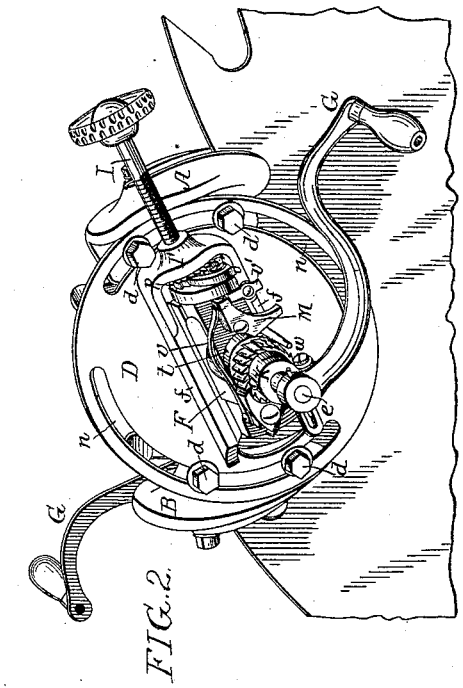
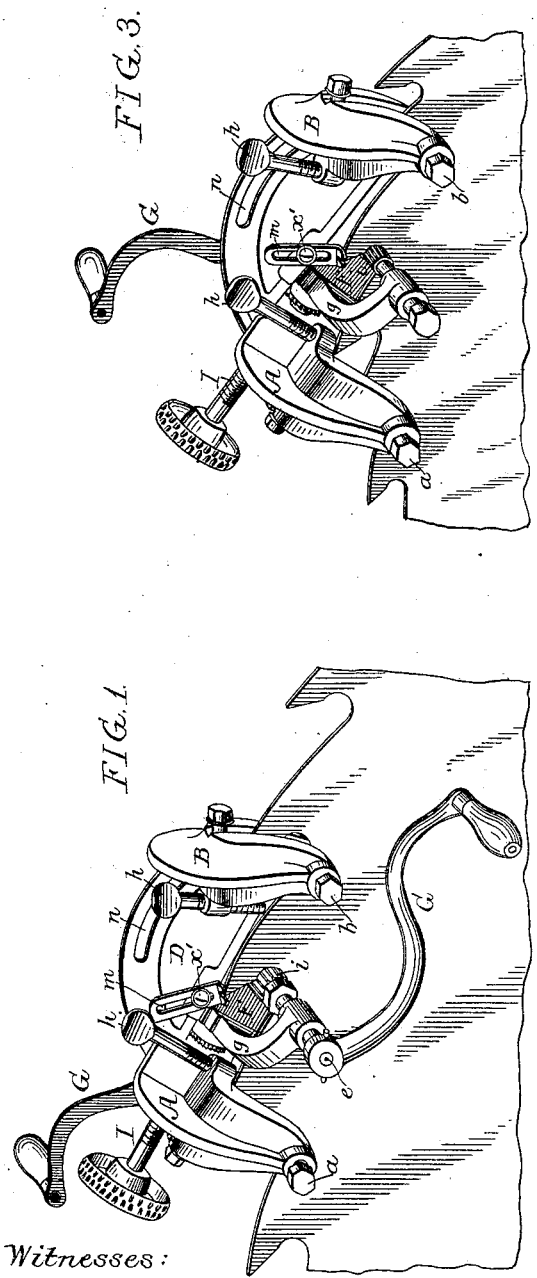
Witnesses:
Murray C. Boyer
A. V. Groupe
Inventor:
Thomas S. Disston
by his Attorneys
Howson & Howson (No Model.) 2 Sheets—Sheet 2.
T. S. DISSTON.
SAW GUMMING MACHINE.
No. 429,019. Patented May 27, 1890.
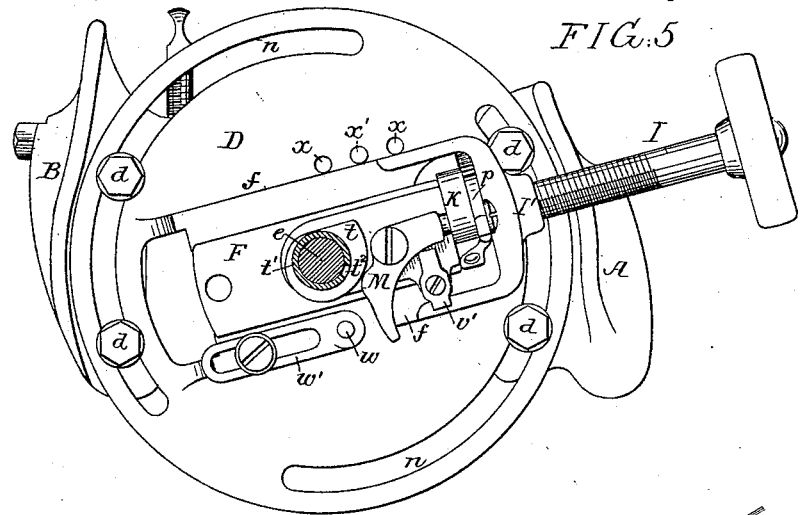
FIG.5
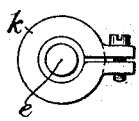
FIG.8
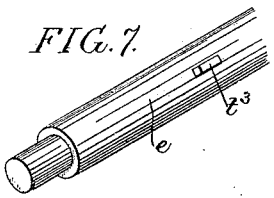
FIG.7
FIG.6
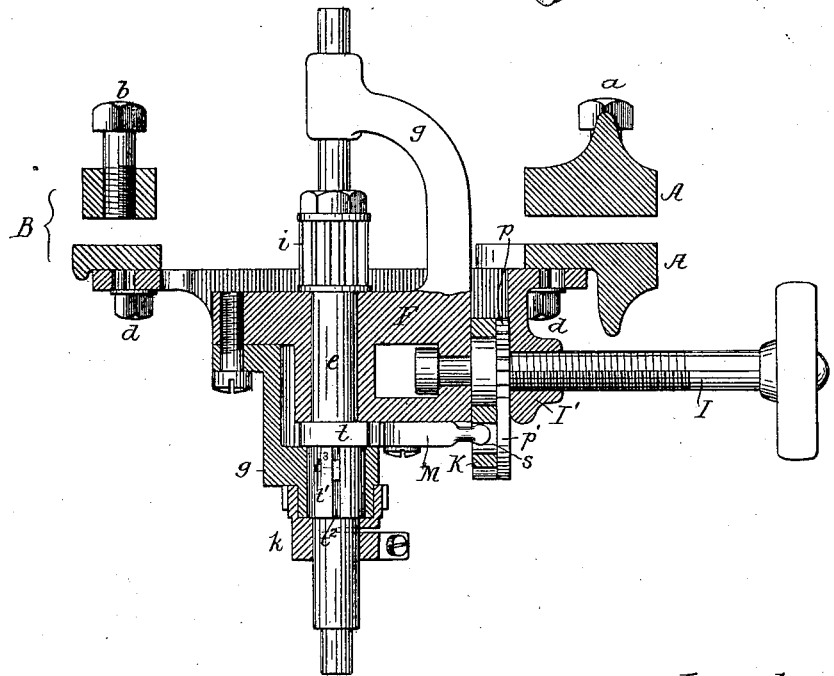
Witnesses:
Murray C. Boyer
A. V. Groupe
Inventor:
Thomas S. Disston
by his Attorneys
Howson & Howson

UNITED STATES PATENT OFFICE.

THOMAS S. DISSTON, OF PHILADELPHIA, PENNSYLVANIA, ASSIGNOR TO HENRY DISSTON & SONS, (INCORPORATED,) OF SAME PLACE.

SAW-GUMMING MACHINE.

SPECIFICATION forming part of Letters Patent No. 429,019, dated May 27, 1890.

Application filed January 25, 1890. Serial No. 338,050. (No model.)

*To all whom it may concern:*

Be it known that I, THOMAS S. DISSTON, a citizen of the United States, and a resident of Philadelphia, Pennsylvania, have invented an Improvement in Saw-Gumming Machines, of which the following is a specification.

The main object of my invention is to so construct a saw-gumming machine that it can be readily applied to saws both large and small and to either circular or straight saws, a further object being to provide simple self-feeding devices for the milling-tool and to effect the automatic stoppage of the feed when the throat of the tooth has been cut out to the proper extent. These objects I attain in the manner hereinafter set forth, reference being had to the accompanying drawings, in which—

Figure 1 is a perspective view of the implement, showing the same as applied to a circular saw of large diameter. Fig. 2 is a similar view, but looking at the opposite side of the implement. Fig. 3 is a view similar to Fig. 1, but showing the implement applied to a circular saw of small diameter. Fig. 4 is a view similar to Figs. 1 and 3, but showing the implement as applied to a straight saw. Fig. 5 is a longitudinal sectional view showing the back of the implement in elevation. Fig. 6 is a sectional plan through the tool-carrying slide and feed-screw, and Figs. 7 and 8 are detached views of parts of the device.

The frame-work of the implement consists of a pair of clamps A B, having set-screws $a$ $b$, whereby they may be securely clamped to the saw adjacent to the toothed edge or periphery of the same. To the backs of these clamps is secured by means of clamp-screws $d$ a circular plate D, on which are formed suitable guides $f$ for the tool-carrying slide F, the latter having suitable bearings $g$ $g$ for the shaft $h$, which carries a milling-tool $i$ of the usual construction, either or both ends of said shaft being provided with crank-handles G, whereby the shaft may be rotated.

In setting the device on a saw the position of the device is determined by set-screws $h$, carried by the clamps, and by a notched gage $m$, secured to the front face of the plate D, and in the latter are formed segmental slots $n$ for the reception of the screws $d$, whereby said plate is secured to the clamps A B, so that when the clamps are properly adjusted upon the saw the plate D can be adjusted on said clamps until the tool $i$ occupies the proper relation to the throat of the tooth upon which it is to act and the direction of the feed is at the desired angle for the deepening of said throat. Having once adjusted the implement in this way for the first tooth to be acted upon, it is simply shifted upon the rim of the saw for action upon the succeeding teeth, the adjustment of the set-screws $h$ and gage $m$ being the same in all cases for the saw which is being acted upon. This facility of adjustment permits the use of the implement either for saws of large diameter—such as shown in Figs. 1 and 2—or for circular saws of smaller diameter—such as shown in Fig. 3—or even for straight saws—such as shown in Fig. 4—the set-screws $h$ in the latter case, however, being inoperative, and the support of the clamps on the saw being effected by means of the L-shaped brackets $h'$, secured to the outer faces of the clamps A B, as shown in said Fig. 4.

The tool-carrying slide F is connected to the swiveled end of the feed-screw I, which is adapted to a nut I' on the back of the plate D, and is provided with a ratchet-wheel $p$, with which engages a pawl $p'$ on a frame K, free to swing on the stem of the screw I and having a vibrating motion imparted to it by a lever M, which is hung to the tool-slide F and has one arm engaging with a notch or recess $s$ in the frame K and another arm acted on by a cam $t$, carried by a sleeve $t'$, which has an elongated slot $t^2$ for the reception of a fin or feather $t^3$ on the shaft $e$. (See Fig. 7.) As the tool-shaft is rotated, therefore, this cam, acting upon the lever M, causes the upward movement of the outer or free end of the swinging frame K, the downward movement of which is effected by a spring $v$, Fig. 2, and is limited by a stop $v'$. (Shown in Figs. 2 and 5.) Each movement of the lever effects such movement of the swinging frame K as will cause the pawl $p'$ to advance the ratchet-wheel $p$ to the extent of one or more teeth, thereby turning the feed-screw I to a corresponding extent and effecting a limited forward movement of the tool-carrying slide.

When the tool approaches the desired limit of the cut, however, the depending arm of the lever M is struck by a pin $w$ on an adjustable slide $w'$, secured to the back of the plate D; hence at such times the backward movement of the lever after each operation of the cam is restricted, until finally this backward movement is not sufficient to cause the pawl $p'$ to engage with the fresh tooth of the ratchet $p$, whereupon the feed motion is arrested, and by adjusting the slide $w'$ this arrest of movement of the tool-carrying slide can be effected at any desired depth of cut.

A clamp-ring $k$, Fig. 8, is secured to one end of the shaft $e$ and abuts against the bearing $g$, as shown in Fig. 6, so as to prevent longitudinal movement of the shaft; but upon loosening this clamp-ring the shaft may be adjusted longitudinally, so as to bring a different cutting-surface on the tool $i$ into action.

The plate D has formed thereon a series of openings $x$, to either of which may be adapted the set-screws $x'$, whereby the notched gage-plate $m$ is secured to said plate D to permit of the different adjustments of the latter required by the different sizes and classes of saws to which the implement is adapted.

Having thus described my invention, I claim and desire to secure by Letters Patent—

1. The combination of two clamps, a circumferentially-adjustable plate carried thereby and carrying the tool-slide, adjustable supporting screws or brackets on the clamps, and an adjustable gage for the point of the tooth, substantially as specified.

2. The combination of the clamps and the plate carried thereby, the tool-slide and its feeding-screw, pawl-and-ratchet mechanism for operating the latter, a cam on the tool-shaft, and a lever acted on by said cam and acting on the pawl-carrier, substantially as specified.

3. The combination of the clamps and the plate carried thereby, the tool-slide, the feed-screw therefor, pawl-and-ratchet mechanism for operating said screw, tool-shaft having a cam, a lever acted on by said cam and acting on the pawl-carrier, and an adjustable stop for throwing said lever out of action when the limit of cut has been reached, substantially as specified.

4. The combination of the clamps and the plate carried thereby, the tool-slide, the feed-screw and its operating mechanism, the tool-shaft, and a clamp-ring screwed thereto and serving to govern the transverse position of the tool, substantially as specified.

5. The combination of the tool-shaft having a projecting fin, the tool-slide, the feed-screw, pawl-and-ratchet mechanism for operating the same, the actuating-cam therefor, a slotted sleeve carrying said cam and engaging with the fin on the tool-shaft, and the bearing-clamp at the end of said tool-shaft, substantially as specified.

In testimony whereof I have signed my name to this specification in the presence of two subscribing witnesses.

THOS. S. DISSTON.

Witnesses:
R. SCHLEICHER,
HARRY SMITH.